Patented Nov. 14, 1950

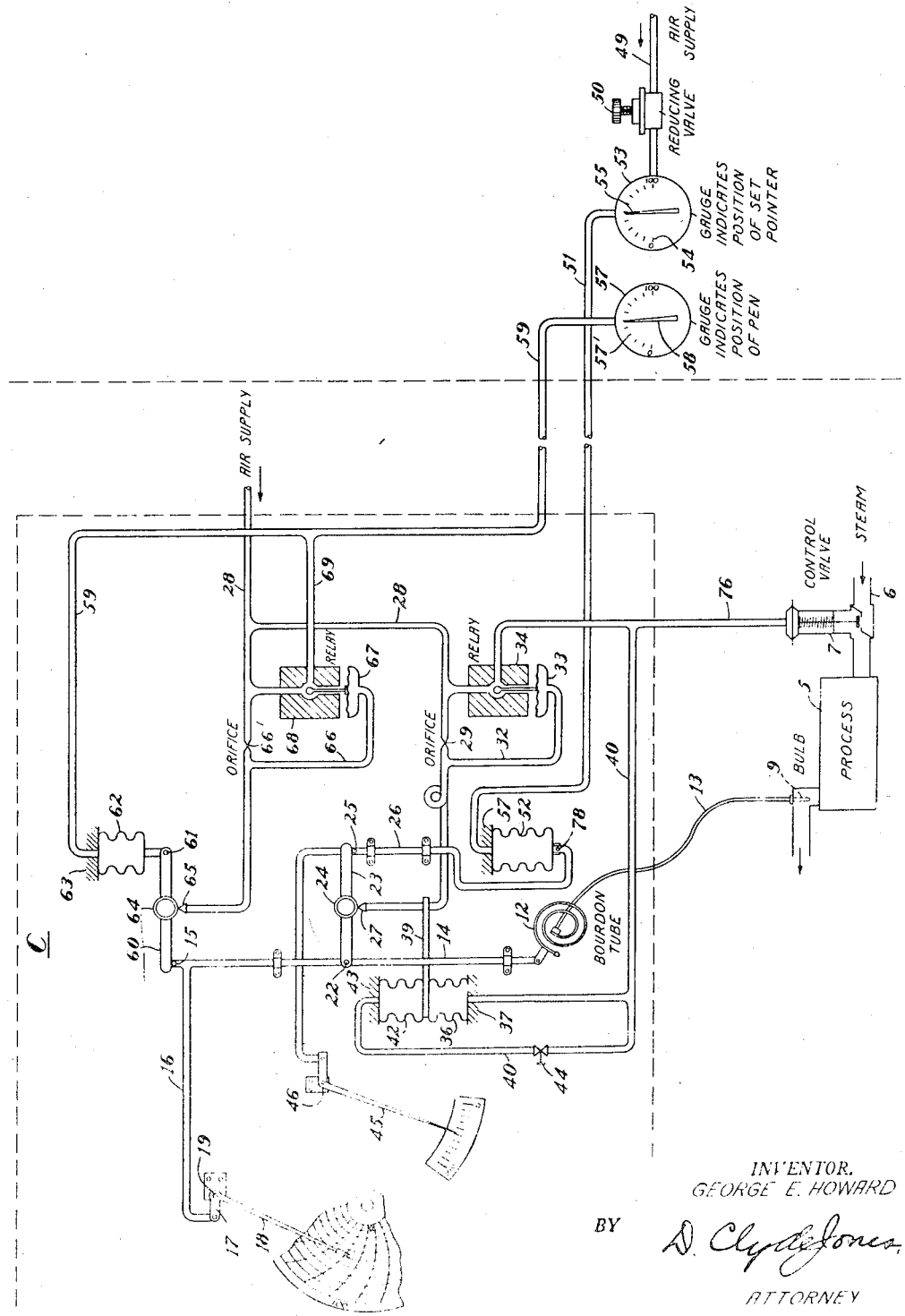

2,529,875

UNITED STATES PATENT OFFICE 2,529,875

CONTROL SYSTEM WITH REMOTE SET POINT ADJUSTMENT AND WITH REMOTE INDICATION

George E. Howard, Gates, N. Y., assignor to Taylor Instrument Companies, Rochester, N. Y., a corporation of New York Application December 31, 1946, Serial No. 719,509

6 Claims. (Cl. 236—51)

This invention relates to a control system.

In the patent to Tate et al. 2,361,885 granted October 31, 1944, there is disclosed a controlling system together with suitable apparatus for use therein.

The present invention has for its purpose, improvements over said system and said apparatus whereby the control apparatus which is located at the process can be selectively adjusted from a control panel located at a distant point and whereby the operation of the controlling apparatus is continually and pneumatically repeated at said panel.

The various features and advantages of the invention will appear from the detailed description and claims when taken with the drawing in which the system is shown diagrammatically, it being understood that the apparatus utilized therein may be similar in structure to that disclosed in the mentioned patent.

Although the control system of the present invention is effective in maintaining any one of a large number of different variables at substantially a given value, it will be described as applied to maintaining the temperature at a given value within a heating unit such as a heating bath 5. Steam for heating, is supplied to this bath through pipe 6 under the control of a pneumatically operated diaphragm motor valve 7. The valve 7 is throttled to adjust the necessary amounts of steam under the control of a combined recorder and controller comprising mechanism, preferably enclosed in a common instrument case indicated in the drawing by the dotted rectangle C. The temperature within the bath is sensed by a bulb 9 projecting into the bath. This bulb together with capillary tube 13 and Bourdon spring 12 which communicate with each other in the order named, constitute a tube system that is filled with a thermosensitive medium. The free end of the Bourdon spring is pivotally connected to a link 14 arranged for lengthwise movement only. The upper end of the link is provided with a horizontally extending pin 15 and with an angular arm 16. The free end of arm 16 is connected to the pen arm bracket 17 to cause it to swing the pen arm 18 about its pivot 19 so that it draws on the circular chart 20, a graph corresponding to the temperature prevailing at the bulb 9. The chart of which only a fragment is illustrated, is rotated in accordance with the passage of time by a clock motor (not shown). At an intermediate point 22 on the link 14, there is pivotally mounted a baffle lever 23 which is provided with a baffle 24. The free end of the baffle lever rests on a horizontally projecting pin 25, carried by the link 26 to be described. The baffle 24 cooperates with the movable nozzle 27. In accordance with the well-known arrangement, compressed air is supplied through pipe 28 and orifice 29 to the nozzle from which it escapes under the control of the baffle 24. If the temperature at the bulb 9 increases, the thermosensitive medium in the tube system expands, causing the Bourdon spring to uncoil. The Bourdon spring elevates the link 14 which in turn raises the baffle 24 from the nozzle 27. This separation of the baffle and nozzle, reduces the back pressure at the nozzle and in the pipe 32 leading to the capsular chamber 33 of the relay valve 34. Therefore the chamber 33 tends to collapse, thereby tending to open the valve 34. The valve under this action of the baffle and nozzle, as it tends to open, supplies compressed air from pipe 28 to the pipe 76 and to the connected diaphragm motor of the valve 7. Valve 7 tends to close, thereby reducing the amount of steam introduced into the bath. A drop in temperature at the bulb 9 operates the portion of the mechanism thus far described, in the same manner but in the reverse sense.

In many installations of the mentioned mechanism, the delay intervening between a change in the amount of heat introduced into the bath and the sensing of the resulting temperature change, causes the mechanism to hunt about the control point or desired temperature.

In order to overcome this tendency for the mechanism to hunt, sensitivity reducing means as disclosed in the mentioned patent, is provided. This means comprises a spring type bellows 36 having its lower end fixed at 37 and having its other end movable. The movable end of bellows carries an arm 39 fixed thereto and to the nozzle 27. Thus the bellows as it expands or contracts, as the case may be, will raise or lower the nozzle 27 with respect to the baffle 24. Since it was assumed that there was a temperature increase at the baffle, the baffle initially was moved away from the nozzle. In response to this action the relay valve 34 tended to open, increasing the air pressure in pipe 76 tending to close valve 7. The increase in air pressure in pipe 76 is communicated through branch pipe 40 to the interior of the bellows 36. This causes the bellows to expand and through the arm 39, tends to raise the nozzle toward the baffle. Inasmuch as the original temperature change moved the baffle away from the nozzle to increase the space therebetween, the follow-up action of the bellows 36, just described, tends to move the nozzle toward the baffle to reduce the space therebetween, with the consequent throttling of relay valve 34. As a result of this follow-up action, the amount of the correction made due to the temperature change, is reduced as compared with the correction that would have resulted in the absence of bellows 36 and its arm 39. This reduction in the amount of correction effected as a result of the follow-up action, is commonly referred to as sensitivity reduction.

A controller incorporating both types of control, as just described, is adequate for many installations but under certain difficult operating conditions such a controller fails to hold the temperature of the bath at the desired control point. In order to prevent such failure, the controller may have incorporated therein means to provide a supplemental control action known as "reset." The effect of this reset action is to cancel out the sensitivity reduction gradually, until the controller restores the temperature of the bath to the desired value or set point. This reset action is effected by additional mechanism comprising a second spring type bellows 42 having its upper end fixed at 43 and its lower movable end acting in opposition to movable end of bellows 36. The air pressure in pipes 76 and 40 is communicated through the pipe 40 and the adjustable needle valve 44 therein to the bellows 42. Thus, both the bellows 36 and the bellows 42 act on the arm 39 to position the nozzle 27, until the pressures in the two bellows are equalized. The adjustment of the needle valve 44 determines the promptness with which the bellows 42 cancels out the sensitivity reduction or follow-up of the bellows 36.

In controllers of this type, there is provided a set pointer such as 45 which is pivoted at 46 so that it can be manually adjusted with respect to a graduated scale to select the given temperature or set point at which the bath 5 will be maintained. In practice, as well as in the disclosure of the mentioned patent, the pivot 19 of the pen arm 18 and the pivot 46 of the set pointer 45 are mounted in alinement so the chart 20 serves as a graduated scale for both. However, in the present diagrammatic showing, the pen arm and set pointer have been illustrated in side-by-side relation for clearness in disclosure, instead of in superimposed relation as in actual practice.

In former control arrangements where a control panel was located at a remote point with respect to bath 5 or other process to be controlled, the recorder controller mechanism similar to that enclosed within the rectangle C, was located at the control panel. Only the control valve such as 7 in the steam line and the bulb 9 were located at the process or bath 5. Consequently the capillary tube 13 and the air pipe 76 were necessarily extended the entire distance between the process and the control panel. The increased length of the capillary tube such as 13 was subjected to varying ambient temperatures with the greatly increased hazards of temperature errors. The increased length of the pipe 76 introduced sluggishness in the correcting action of the valve 7 when a temperature change or deviation occurred at the bulb 9.

In accordance with the present invention, not only the bulb 9 and the motor valve 7 are located at the process but also the mechanism of the recorder-controller within the recangle C, are located at the process. The capillary 13 and the pipe 76 can, therefore, be made as short as desired. However, means are provided at the control panel, illustrated at the right of the broken line, for remotely changing the set point of the recorder-controller and for pneumatically providing at the control panel an indication not only of the position of the set pointer 45 but also the position of the pen 18. In order to change the adjustment of the set pointer 45 by remote control, there is provided at the control panel a source of compressed air supplied through pipe 49 and thence through the manually adjustable reducing valve 50 and pipe 51 to the interior of a bellows 52 at the distant recorder-controller. A pressure gauge 53 responsive to the air pressure in pipe 51, is provided with a graduated temperature scale 54 similar to that at the recorder-controller C so that the needle 55 of the gauge 53 repeats the position of the set-pointer 45 at the controller C. The upper end of the bellows 52 is attached to a support 57 while the lower or movable end thereof is pivotally connected at 78 to the link 26. As the pressure in pipe 51 and in the bellows 52 increases, the needle 55 of the gauge 53 moves clockwise to indicate the new set point and the bellows 57 tends to expand. This action of the bellows forces the link 26 downward. The downward movement of the link swings the set pointer 45 about its pivot 46 until this pointer assumes a new set point position the same as that indicated by the needle 55 at the gauge 53.

The position of the pen 18 of the recorder-controller C, is repeated at the control panel by a second gauge 57. This gauge is provided with a needle 58 movable over a scale 57', graduated in accordance with possible positions of pen 18. The gauge 57 is actuated by the variation in pressure in the pipe 59 which leads to the controller C where the pressure is varied in accordance with the position of pen 18. This result is achieved by the following mechanism. It has been mentioned that the upper end of the link 14 is provided with a horizontally projecting pin 15. This pin supports one end of a baffle lever 60 which has its other end pivoted at 61 on the lower or movable end of the bellows 62. Bellows 62 has its upper end secured to the fixed support 63 and has its interior communicating with pipe 59. The baffle lever 60 is provided at an intermediate point with a baffle 64 which cooperates with a fixed nozzle 65. Compressed air is supplied through pipe 28 and the orifice 66' to the nozzle where it escapes under the control of the baffle 64. When the upper end of the link 14 is raised as results when the Bourdon spring 12 uncoils in response to an increase in temperature at the bulb 9, the pen arm 18 is moved clockwise to record a higher temperature on the chart 20 and the pin 15 raises the left end of the baffle lever 60. This movement of the lever lifts the baffle 64 away from the nozzle 65 so that there is a drop in the back pressure at the nozzle and in the pipe 66 communicating with capsular chamber 67. In response to this drop in pressure, the chamber tends to open the relay valve 68 so that increased air pressure is supplied from pipe 28, through relay valve 68 and branch pipe 69 which communicates with pipe 59 leading to the gauge 57 at the control panel. The pressure in the pipe 59 is proportional to the temperature deviation at the bulb 9 so that the needle 58 of the gauge 57 will assume a position corresponding the position of the pen arm 18 which is also moved proportionally to the temperature deviation. It will be noted that the pipe 59 communicates with the bellows 62, so that when the pressure in the pipe 59 increases due to the mentioned separation between the baffle 64 and bellows 65, the bellows 62 expands. As a result of this expansion, the right end of the baffle lever 60 is lowered to reduce the original separation of the baffle and nozzle in response to the temperature deviation. Here also is provided a follow-up action similar to that already described so that spacing between the baffle 64 and nozzle 65, during periods of stability, will be .0015 of an inch, throughout the range of movement of the pen arm 18.

It will be understood that the present disclosure is given by way of example only, and that there can be various changes and modifications thereof within the scope of the appended claims, without departing from the spirit of the present invention.

What I claim is:

1. In a pneumatically operated condition controller for maintaining a condition at a desired set point, means for sensing deviations in said condition from said set point, a pneumatic couple comprising a relatively movable nozzle supplied with compressed air or the like and a baffle for variably obstructing the escape of compressed air through said nozzle and thereby varying the back pressure at said nozzle, means including said sensing means for changing the spacing between said baffle and nozzle in response to each deviation, a relay valve operated by said back pressure, a pneumatically operated member for applying a medium to correct the deviation in said condition, means including said relay valve for applying compressed air at controlled pressures to said member, a second pneumatic couple comprising a relatively movable nozzle supplied with compressed air or the like and a baffle for variably obstructing the escape of compressed air through said nozzle and thereby varying the back pressure at said nozzle, means including said sensing means for changing the spacing between said baffle and nozzle of said second couple in response to said deviation, a second relay valve having an outlet and actuated by said last-mentioned back pressure, for supplying to said outlet compressed air at controlled pressures, means including a bellows responsive to said last-mentioned controlled pressures to reduce the change in the space relation between said baffle and said nozzle of said second couple, due to any given deviation in said condition, a remote station provided with a pneumatically operated condition indicator, and a pipe extending between said outlet and said indicator.

2. In a control system, a processing unit, a pipe for a processing medium connected to said unit, a pneumatically operated motor valve controlling the passage of the medium through said pipe, a control pipe communicating with the motor of said valve, a single sensing means responsive to changes in the condition in said unit, a pneumatically operated control mechanism effective in response to deviations in the condition in said unit from a given set point, as sensed by said sensing means for supplying operating compressed air through said control pipe to the motor of said valve to correct for said deviations, said control mechanism being provided with pneumatically operated adjustable set point means whereby the value of the condition to be maintained in said unit can be selected at will, a remote station, means at said station for selectively positioning said set point means at will, pneumatically operated indicating means at said station for showing the varying value of the condition sensed by said sensing means and other separate means controlled by said sensing means for supplying operating compressed air to said indicating means at pressures proportional to the values of the condition at said unit.

3. In a control system, a processing unit, a pipe for supplying a processing medium connected to said unit, a pneumatically operated valve controlling the passage of the medium through said pipe, pneumatically operated control mechanism effective in response to deviations in a condition in said unit from a control point, as sensed at said unit, for supplying operating air pressure to said valve, said control mechanism being provided with pneumatically operated adjustable set point means, whereby the value of the condition to be maintained in said unit can be selected at will, a pneumatic couple comprising a relatively movable nozzle supplied with compressed air or the like and a baffle for variably obstructing the escape of compressed air through said nozzle and thereby varying the back pressure at said nozzle, means including condition sensing means for changing the spacing between said baffle and nozzle in response to each condition deviation, a relay valve having an outlet and actuated by said back pressure, for supplying to said outlet compressed air at controlled pressures, means including a bellows responsive to said last-mentioned controlled pressures to reduce the change in the space relation between said baffle and said nozzle of said couple, due to any given deviation in said condition, a remote station, means at said station for applying compressed air at selected pressures to said set point means to adjust the same at will, pneumatically operated indicating means at said station for showing the varying value of the condition sensed by said mechanism, and a pipe connecting the outlet of said relay valve to said indicating means, the outlet air pressure of said relay as applied through said pipe being the sole operating medium of said indicating means.

4. In a pneumatically operated condition controlling system for maintaining a condition at a given set point, a controller including pneumatically-operated set point means and means for sensing deviations in said condition from said set point, a pneumatic couple comprising a relatively movable nozzle supplied with compressed air or the like and a baffle for variably obstructing the escape of compressed air through said nozzle thereby varying the back pressure at said nozzle, means including said sensing means for changing the spacing between said baffle and nozzle in response to each deviation, a relay valve operated by said back pressure, a pneumatically operated member for applying a medium to correct the deviation in said condition, means including said relay valve for applying compressed air at controlled pressures to said member, means including a bellows responsive to each controlled pressure to reduce the change in the spacing between said baffle and said nozzle due to any given deviation in said condition, a remote station provided with a pneumatically operated condition indicator, a pipe extending between said controller and said indicator, means including said pipe for applying to said indicator compressed air at pressures proportional to the value of the condition, said indicator being positioned solely in response to the pressures of said last-mentioned compressed air, and means at said remote station for applying compressed air at selected pressures to said set point means to adjust the same at will.

5. In a pneumatically operated condition controlling system for maintaining a condition at a desired set point, a controller including pneumatically-operated set point means and means for sensing deviations in said condition from said set point, a pneumatic couple comprising a relatively movable nozzle supplied with compressed air or the like and a baffle for variably obstructing the escape of compressed air through said nozzle thereby varying the back pressure at said nozzle, means including said sensing means for changing the spacing between said baffle and nozzle in response to each deviation, a relay valve operated by said back pressure, a pneumatically operated member for applying a medium to correct the deviation in said condition, means including said relay valve for applying compressed air at controlled pressures to said member, means including a bellows responsive to each controlled pressure to reduce the change in the spacing between said baffle and said nozzle due to any given deviation in said condition, a second bellows tending to oppose the action of said first mentioned bellows, means for applying each controlled pressure through a restricted passage to the interior of said bellows, a remote station provided with a pneumatically operated condition indicator, a pipe extending between said controller and said indicator, and transmitting means including said pipe for applying to said indicator compressed air at pressures proportional to the value of the condition, said indicator being operated solely in response to changes in pressure of said last-mentioned compressed air, and means at said remote station for applying compressed air at selected pressures to said set point means to adjust the same at will.

6. In a pneumatically operated condition controlling system for maintaining a condition at a desired set point, a controller including means for sensing deviations in said condition, from said set point, a pneumatic couple comprising a relatively movable nozzle supplied with compressed air or the like and a baffle for variably obstructing the escape of compressed air through said nozzle thereby varying the back pressure at said nozzle, means including said sensing means for changing the spacing between said baffle and nozzle in response to each deviation, a relay valve operated by said back pressure, a pneumatically operated member for applying a medium to correct the deviation in said condition, means including said relay valve for applying compressed air at controlled pressures to said member, means including a bellows responsive to each controlled pressure to reduce the change in the spacing between said baffle and said nozzle due to any given deviation in said condition, a second bellows tending to oppose the action of said first mentioned bellows, means for applying such controlled pressure through a restricted passage to the interior of said bellows, a second pneumatic couple comprising a relatively movable nozzle supplied with compressed air or the like and a baffle for variably obstructing the escape of compressed air through said nozzle and thereby varying the back pressure at said nozzle, means including said sensing means for changing the spacing between said baffle and nozzle of said second couple in response to said deviation, a second relay valve having an outlet and actuated by said last-mentioned back pressure, for supplying to said outlet compressed air at controlled pressures, means including a bellows responsive to said last-mentioned controlled pressures to reduce the change in the space relation between said baffle and said nozzle of said second couple, due to any given deviation in said condition, a remote station provided with a pneumatically operated condition indicator, a pipe extending between said outlet and said indicator.

GEORGE E. HOWARD.

REFERENCES CITED

The following references are of record in the file of this patent:

UNITED STATES PATENTS

| Number | Name | Date |
|---|---|---|
| Re. 19,276 | Wunsch | Aug. 14, 1934 |
| 2,205,930 | Otto | June 25, 1940 |
| 2,223,712 | Ziebolz | Dec. 3, 1940 |
| 2,312,201 | Thompson | Feb. 23, 1943 |
| 2,361,885 | Tate | Oct. 31, 1944 |